United States Patent
Ly et al.

(10) Patent No.: US 12,289,709 B2
(45) Date of Patent: *Apr. 29, 2025

(54) PAGING INDICATION FOR COMMUNICATING A PAGING CONTROL CHANNEL

(71) Applicant: QUALCOMM Incorporated, San Diego, CA (US)

(72) Inventors: Hung Dinh Ly, San Diego, CA (US); Peter Pui Lok Ang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,922

(22) Filed: Apr. 1, 2024

(65) Prior Publication Data

US 2024/0334390 A1 Oct. 3, 2024

Related U.S. Application Data

(63) Continuation of application No. 16/949,557, filed on Nov. 3, 2020, now Pat. No. 11,979,852.
(Continued)

(51) Int. Cl.
*H04W 68/00* (2009.01)
*H04L 5/00* (2006.01)
(Continued)

(52) U.S. Cl.
CPC ......... *H04W 68/005* (2013.01); *H04L 5/0051* (2013.01); *H04W 24/08* (2013.01);
(Continued)

(58) Field of Classification Search
CPC ... H04W 68/005; H04W 72/23; H04W 24/08; H04W 24/10; H04W 72/0046;
(Continued)

(56) References Cited

U.S. PATENT DOCUMENTS 8,301,176 B1 10/2012 Yellin et al.
8,914,048 B2 12/2014 Montojo et al.
(Continued)

FOREIGN PATENT DOCUMENTS

EP 3471318 A1 4/2019
WO WO-2007127945 11/2007
(Continued)

OTHER PUBLICATIONS

"Method and Apparatus for Channel Measurement and Reporting in CORESET Basis", Qiongjie Lin; Mar. 26, 2019; Qualcomm (Year: 2019).*

(Continued)

*Primary Examiner* — Ian N Moore
*Assistant Examiner* — Latresa A McCallum
(74) *Attorney, Agent, or Firm* — Harrity & Harrity, LLP

(57) ABSTRACT

Various aspects of the present disclosure generally relate to wireless communication. In some aspects, a user equipment (UE) may receive a reference signal or channel conveying a paging indicator. The UE may determine, based on the paging indicator, whether to monitor a paging control channel including a scheduling grant for a paging shared channel communication. The UE may estimate time or frequency information for receiving the paging control channel based at least in part on a result of the determining, and receiving the paging control channel containing based at least in part on the result of the determining and the estimated time or frequency information, or skipping monitoring the paging (Continued)

control channel based at least in part on the result of the determining. Numerous other aspects are provided.

20 Claims, 10 Drawing Sheets

Related U.S. Application Data

(60) Provisional application No. 62/932,266, filed on Nov. 7, 2019.

(51) Int. Cl.
| | |
|---|---|
| *H04W 24/08* | (2009.01) |
| *H04W 24/10* | (2009.01) |
| *H04W 72/0446* | (2023.01) |
| *H04W 72/0453* | (2023.01) |
| *H04W 72/23* | (2023.01) |

(52) U.S. Cl.
CPC ....... *H04W 24/10* (2013.01); *H04W 72/0446* (2013.01); *H04W 72/0453* (2013.01); *H04W 72/23* (2023.01)

(58) Field of Classification Search
CPC ........... H04W 72/0453; H04W 68/025; H04W 76/28; H04L 5/0051; H04L 5/0048; H04L 5/0053; H04L 5/0044
See application file for complete search history.

(56) References Cited

U.S. PATENT DOCUMENTS

| | | | |
|---|---|---|---|
| 2010/0056164 A1 | 3/2010 | Ishii et al. | |
| 2018/0035380 A1 | 2/2018 | Chen et al. | |
| 2018/0054291 A1* | 2/2018 | Yi | H04L 5/0064 |
| 2018/0146478 A1 | 5/2018 | Kim et al. | |
| 2018/0199309 A1 | 7/2018 | Islam et al. | |
| 2018/0199310 A1 | 7/2018 | Islam et al. | |
| 2019/0166513 A1 | 5/2019 | Lin | |
| 2019/0223150 A1 | 7/2019 | Islam et al. | |
| 2019/0230624 A1 | 7/2019 | Islam et al. | |
| 2019/0239189 A1* | 8/2019 | Hwang | H04W 52/0229 |
| 2019/0245595 A1 | 8/2019 | Xu et al. | |
| 2019/0254110 A1 | 8/2019 | He et al. | |
| 2020/0092073 A1 | 3/2020 | Papasakellariou et al. | |
| 2020/0169980 A1* | 5/2020 | Du | H04W 68/005 |
| 2020/0305232 A1 | 9/2020 | Miao | |
| 2020/0314811 A1 | 10/2020 | Lin et al. | |
| 2021/0144672 A1 | 5/2021 | Ly | |

FOREIGN PATENT DOCUMENTS

| | | | | |
|---|---|---|---|---|
| WO | WO-2017196243 A1 | 11/2017 | | |
| WO | WO-2017196612 A1 | 11/2017 | | |
| WO | WO-2017200541 A1 * | 11/2017 | ........ | H04W 52/0216 |
| WO | WO-2019099661 A1 | 5/2019 | | |

OTHER PUBLICATIONS

"3rd Generation Partnership Project; Technical Specification Group Radio Access Network; Physical Channels and Mapping of Transport Channels onto Physical Channels ( FDD) (Release 15)", 3GPP Standard; Technical Specification; 3GPP TS 25.211, 3rd Generation Partnership Project, Mobile Competence Centre, 650, Route Des Lucioles, F-06921, Sophia-Antipolis Cedex, France, vol. RAN WG6. No. V15.0.0, Jun. 26, 2018, pp. 1-67, XP051474193, chapters 5.3.3.10. 7.2A.

"3rd Generation Partnership Project; Technical Specification Group Radio Access Network; User Equipment (UE) Procedures in Idle Mode and Procedures for Cell Reselection in Connected Mode (Release 15)", 3GPP Standard, Technical Specification, 3GPP TS 25.304, 3rd Generation Partnership Project, Mobile Competence Centre, 650, Route Des Lucioles, F-06921, Sophia-Antipolis Cedex, France, vol. RAN WG6. No. V15.0.0, Jun. 27, 2018, pp. 1-58, XP051474316, Chapter 8.3.

Huawei: "Further Discussion on Enhanced Paging Procedure," 3GPP Draft, 3GPP TSG RAN WG2 #56 bis, R2-070152, 3rd Generation Partnership Project (3GPP), Mobile Competence Centre, 650, Route Des Lucioles, F-06921, Sophia-Antipolis Cedex, France, vol. RAN WG2. No. Sorrento. Italy, Jan. 15-19, 2006, Jan. 12, 2007, Jan. 12, 2007 (Jan. 12, 2007), XP050133260, 3 pages, [retrieved on Jan. 12, 2007] * chapter 1 *.

International Preliminary Report on Patentability—PCT/US2020/070748, The International Bureau of WIPO—Geneva, Switzerland, May 19, 2022.

International Search Report and Written Opinion—PCT/US2020/070748—ISA/EPO—Feb. 11, 2021.

Anonymous: "3 Generation Partnership Project, Technical Specification Group Radio Access Network, Evolved Universal Terrestrial Radio Access (E-UTRA), User Equipment (UE) Procedures in Idle Mode (Release 15)", 3GPP Standard, Technical Specification, 3GPP TS 36.304, 3rd Generation Partnership Project, Mobile Competence Centre, 650, Route Des Lucioles, F-06921 Sophia-Antipolis Cedex, France, vol. RAN WG2, No. V15.4.0, Jun. 25, 2019, XP051754352, pp. 1-55.

CATT: "UE Power Saving Schemes with Power Saving", 3GPP TSG RAN WG1 Meeting #95, R1-1812642, 3rd Generation Partnership Project, Mobile Competence Centre, 650, Route Des Lucioles, F-06921, Sophia-Antipolis Cedex, FRANCE, Nov. 12-16, 2018, Nov. 3, 2018, 10 pages, XP051478884.

* cited by examiner

PAGING INDICATION FOR COMMUNICATING A PAGING CONTROL CHANNEL

CROSS-REFERENCE TO RELATED APPLICATION

This Patent Application is a Continuation of U.S. Non-Provisional application Ser. No. 16/949,557, filed on Nov. 3, 2020, entitled "PAGING INDICATION FOR COMMUNICATING A PAGING CONTROL CHANNEL", which claims priority to U.S. Provisional Patent Application No. 62/932,266, filed on Nov. 7, 2019, entitled "PAGING INDICATION," and are assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for paging indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving a reference signal or channel conveying a paging indicator; determining, based on the paging indicator, whether to monitor a paging control channel including a scheduling grant for a paging shared channel communication; and estimating time or frequency information for receiving the paging control channel based at least in part on a result of the determining, and receiving the paging control channel containing based at least in part on the result of the determining and the estimated time or frequency information, or skipping monitoring the paging control channel based at least in part on the result of the determining.

In some aspects, a UE for wireless communication includes a memory; and one or more processors operatively coupled to the memory, the memory and the one or more processors configured to: receive a reference signal or channel conveying a paging indicator; determine, based on the paging indicator, whether to monitor a paging control channel including a scheduling grant for a paging shared channel communication; and estimate time or frequency information for receiving the paging control channel based at least in part on a result of the determining, and receive the paging control channel containing based at least in part on the result of the determining and the estimated time or frequency information, or skip monitoring the paging control channel based at least in part on the result of the determining.

In some aspects, a non-transitory computer-readable medium storing a set of instructions for wireless communication includes one or more instructions that, when executed by one or more processors of a UE, cause the UE to: receive a reference signal or channel conveying a paging indicator; determine, based on the paging indicator, whether to monitor a paging control channel including a scheduling grant for a paging shared channel communication; and estimate time or frequency information for receiving the paging control channel based at least in part on a result of the determining, and receive the paging control channel containing based at least in part on the result of the determining and the estimated time or frequency information, or skip monitoring the paging control channel based at least in part on the result of the determining.

In some aspects, an apparatus for wireless communication includes means for receiving a reference signal or channel conveying a paging indicator; means for determining, based on the paging indicator, whether to monitor a paging control channel including a scheduling grant for a paging shared channel communication; and means for estimating time or frequency information for receiving the paging control channel based at least in part on a result of the determining, and means for receiving the paging control channel containing based at least in part on the result of the determining and the estimated time or frequency information, or means for skipping monitoring the paging control channel based at least in part on the result of the determining.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
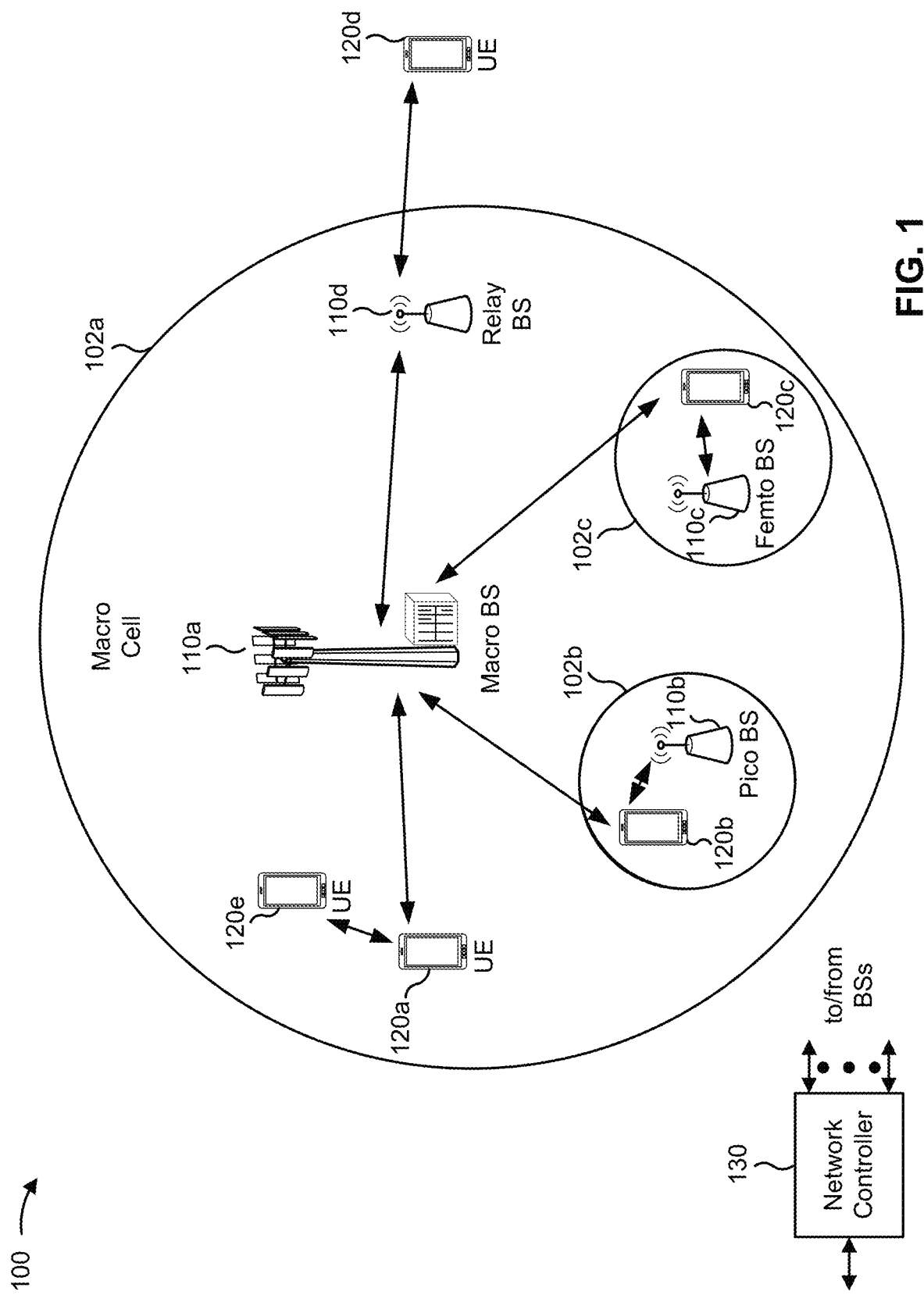
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
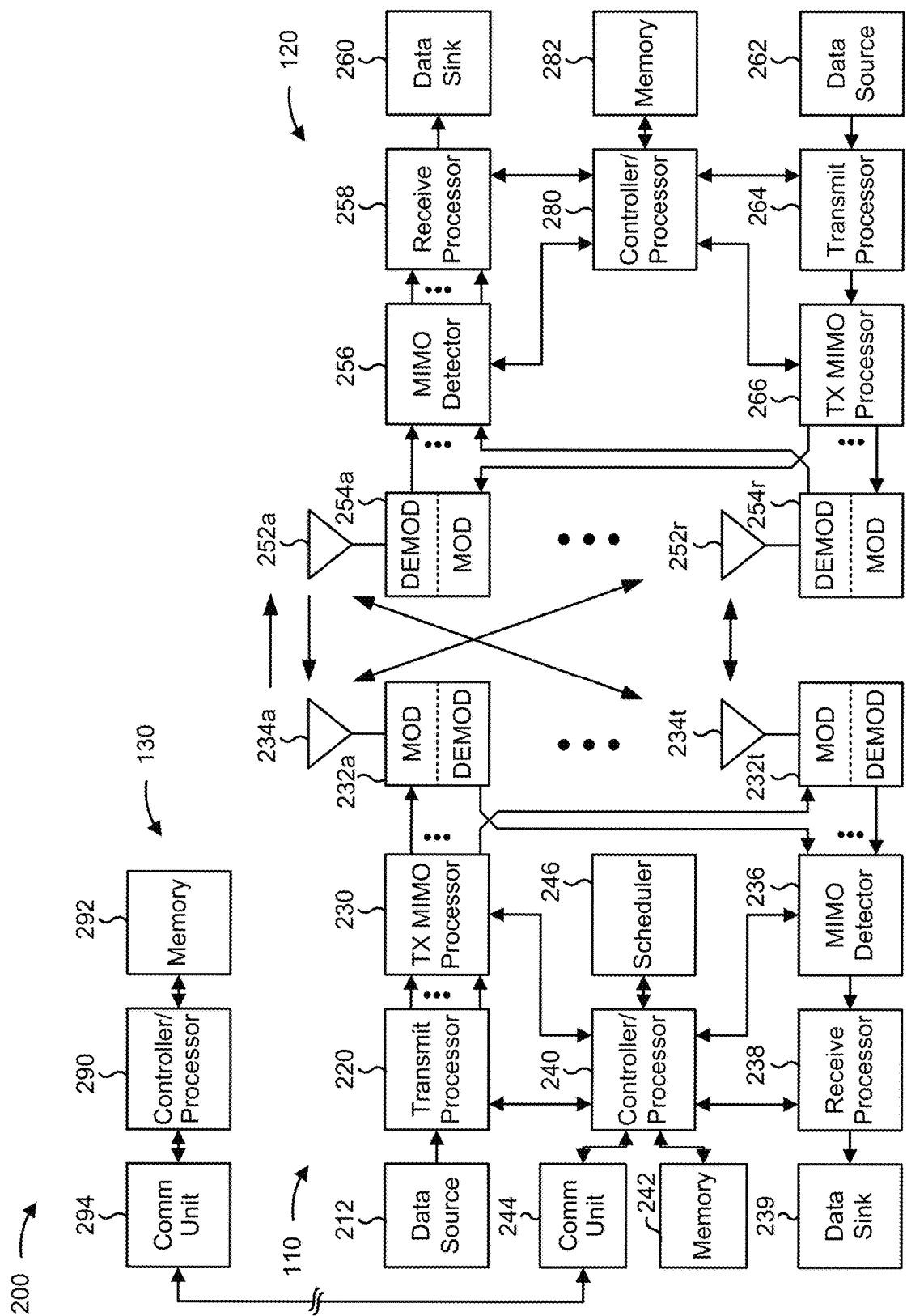
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with paging indication, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for receiving a reference signal or channel conveying a paging indicator; means for determining, based on the paging indicator, whether to monitor a paging control channel including a scheduling grant for a paging shared channel communication; means for estimating time or frequency information for receiving the paging control channel based at least in part on a result of the determining; means for receiving the paging control channel containing based at least in part on the result of the determining and the estimated time or frequency information; means for skipping monitoring the paging control channel based at least in part on the result of the determining; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
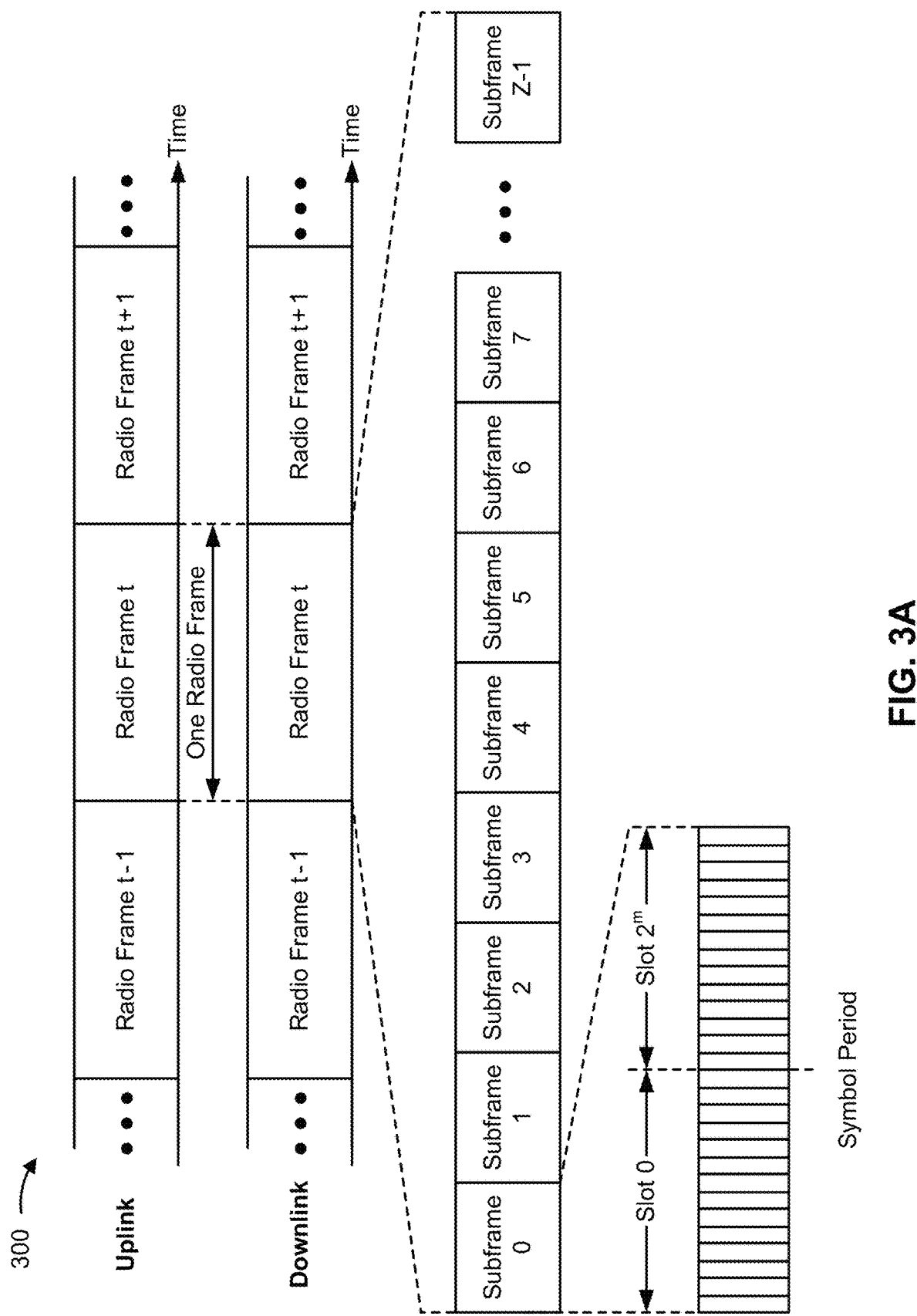
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
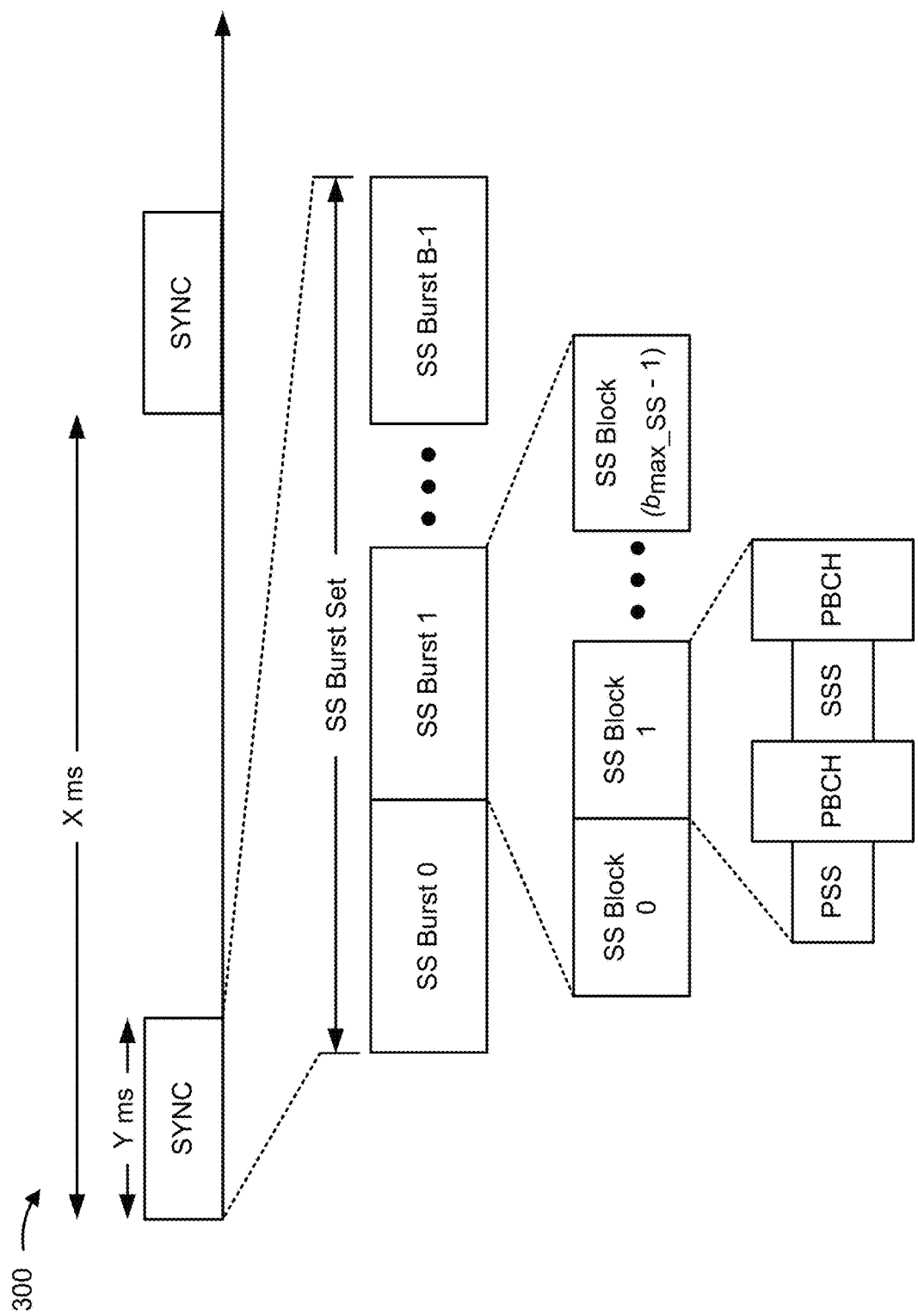
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block (bmax_ss-1), where bmax_ss-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
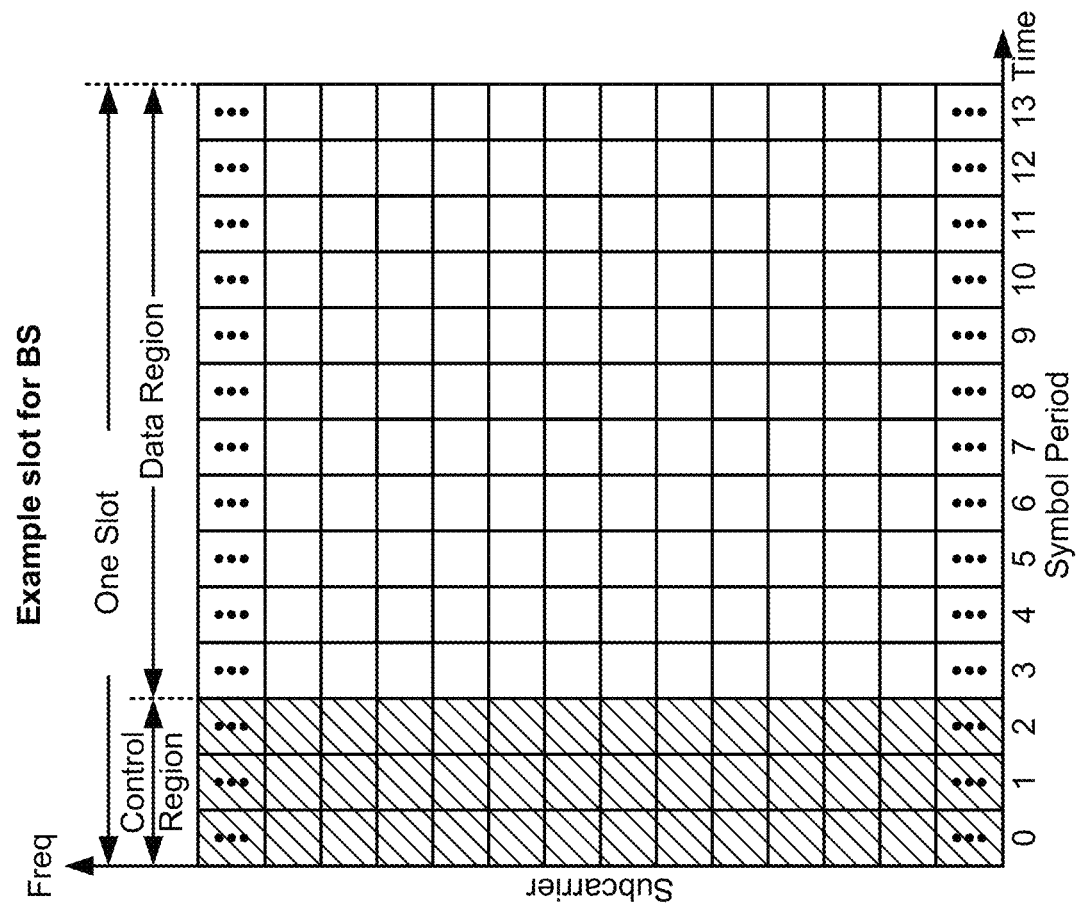
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q-1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
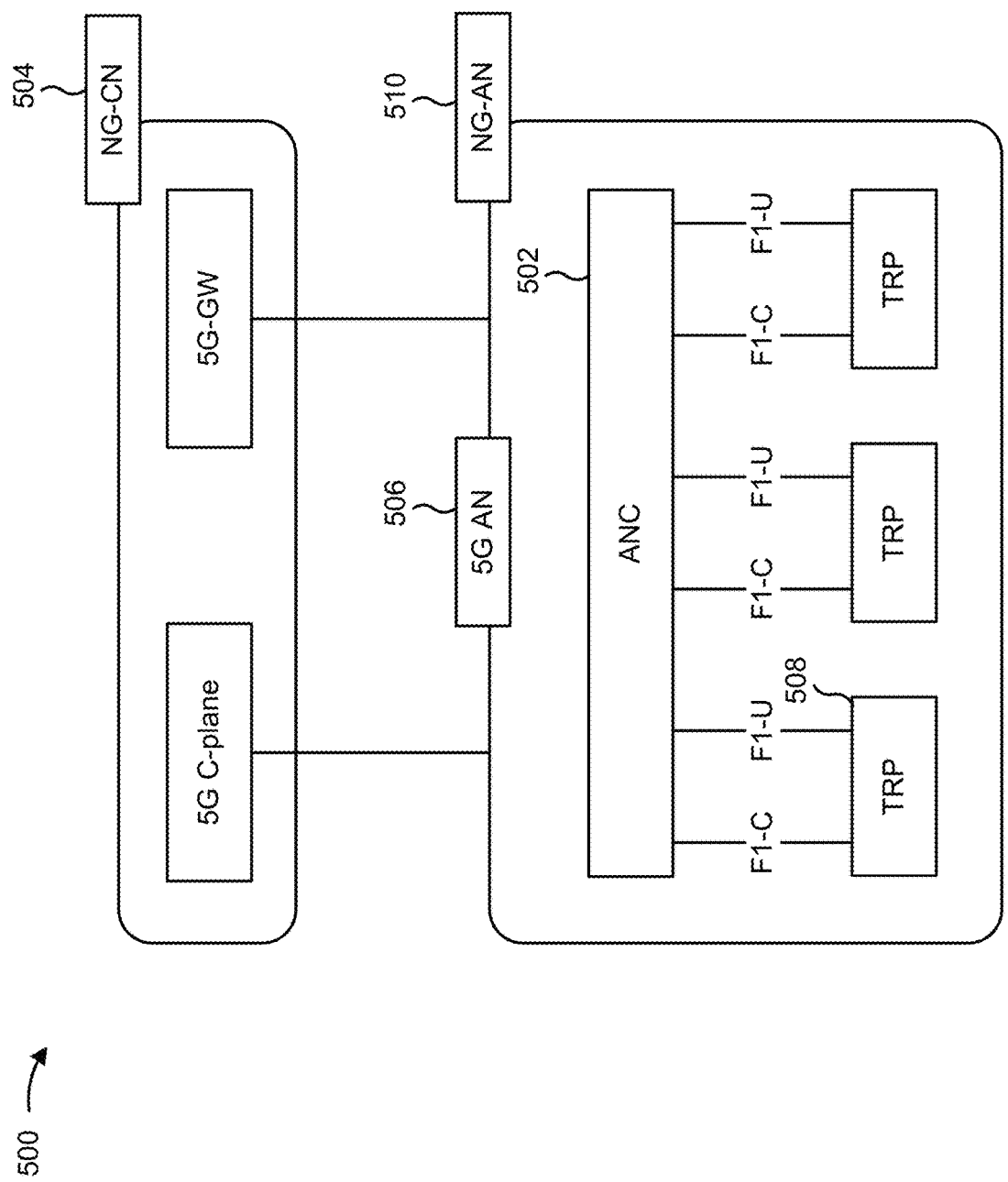
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
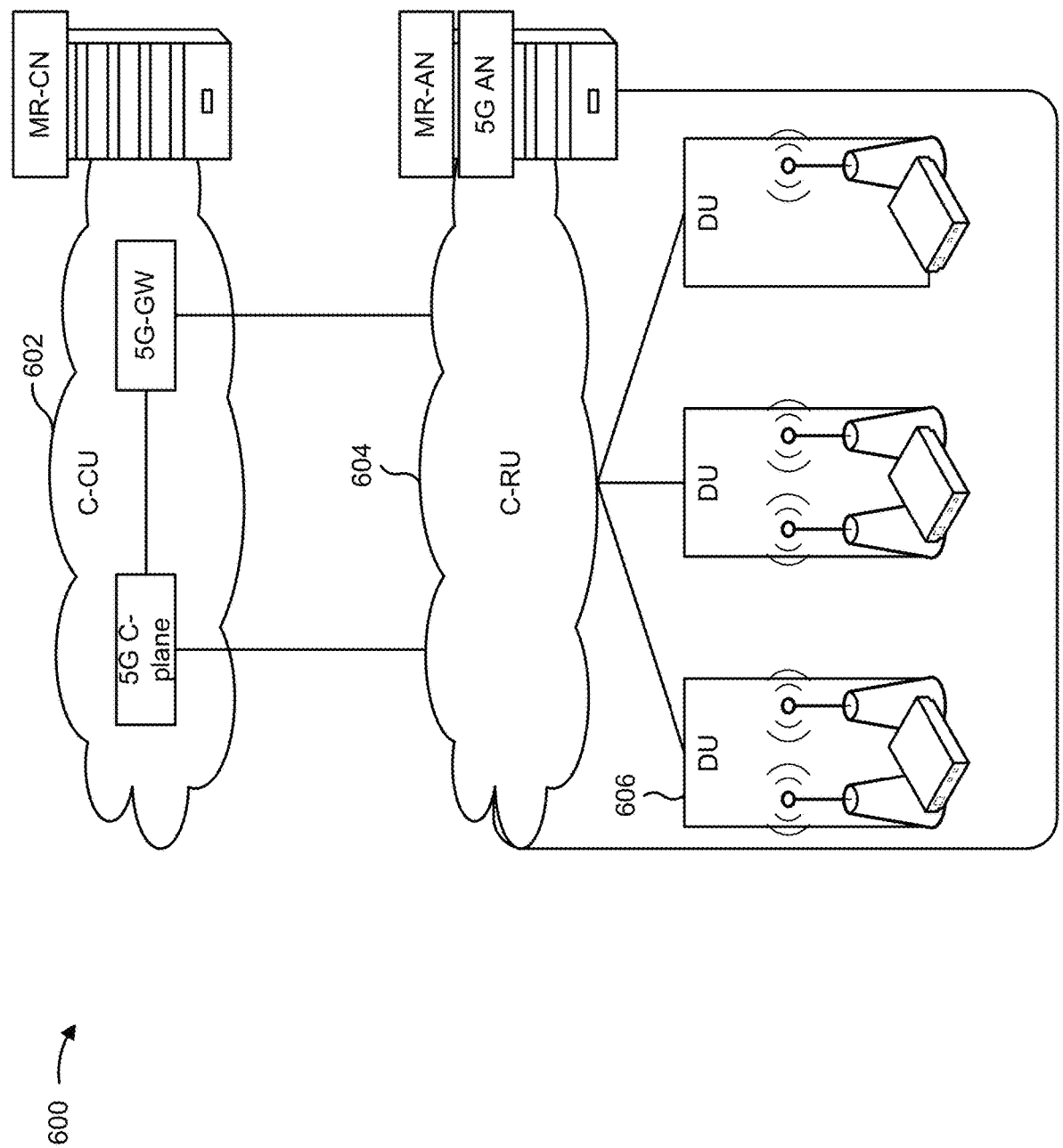
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as 5G, a UE may utilize a low power state to reduce power consumption during periods of time when, for example, the UE is not scheduled to receive data from a BS on a downlink or transmit data to the BS on the uplink. For example, in discontinuous reception (DRX) operation, the UE may periodically enter a low-power state, which may be termed a sleep state, in which the UE uses less power than in a normal-power state, which may be termed an awake state. Periodically, the UE may transition from the low-power state to the normal-power state to receive signaling from the BS and/or to transmit signaling to the BS.

However, transitioning from the low-power state to the normal-power state may result in increased utilization of power resources relative to remaining in the low-power state. In some cases, the UE may transition to the normal power state, but signaling may not be scheduled for the UE. Thus, some aspects described herein provide for a reference signal or channel that conveys paging indication. For example, during a first period of time, the UE may monitor for a reference signal or channel from the BS indicating whether to monitor for a downlink channel (e.g., a physical downlink control channel (PDCCH) and/or a physical downlink shared channel (PDSCH)). In this case, the paging indicator may indicate whether a page is scheduled for transmission to the UE. When a page is scheduled for transmission, the UE may remain in the normal-power state to monitor for the page. In contrast, when a page is not scheduled for transmission, the UE may skip switching to the normal-power state for, for example, a plurality of paging cycles, thereby reducing a utilization of power resources.

Figure 7A:
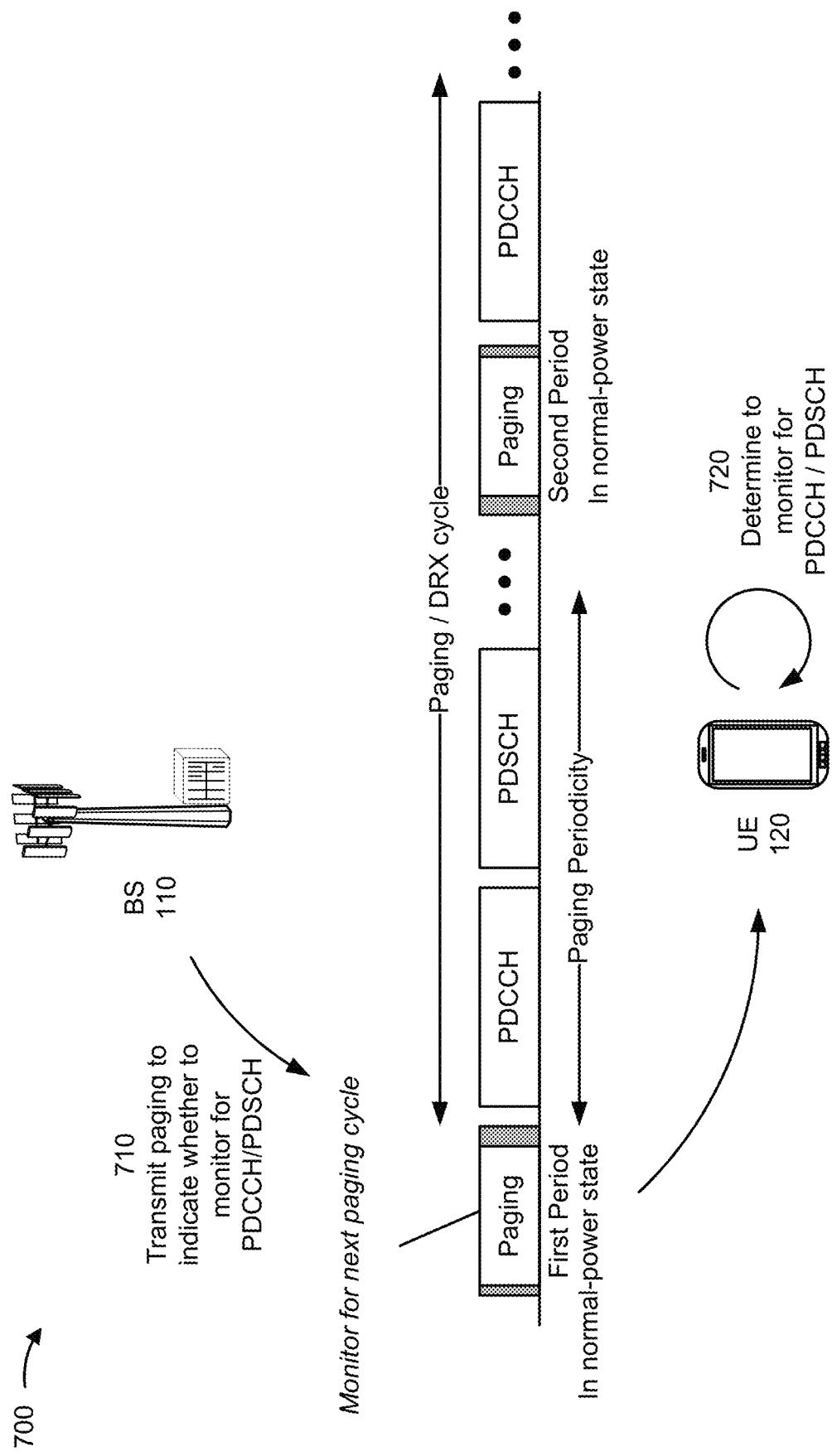
FIGS. 7A and 7B are diagrams illustrating an example of paging indication, in accordance with various aspects of the present disclosure.
Figure 7B:
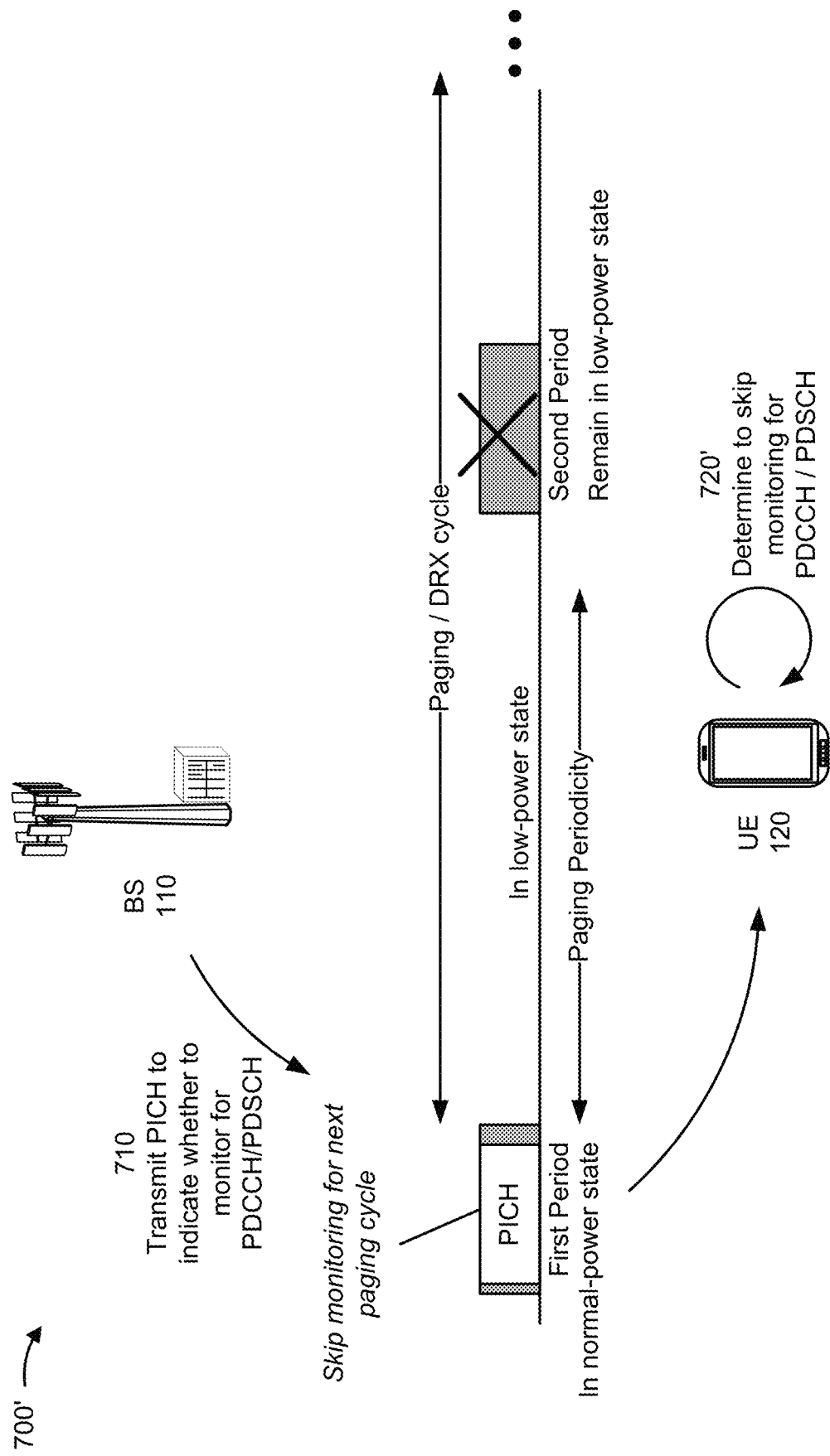

FIGS. 7A and 7B are diagrams illustrating examples 700/700' of paging indication, in accordance with various aspects of the present disclosure. As shown in FIGS. 7A and 7B, examples 700/700' include a BS 110 and a UE 120.

As further shown in FIG. 7A, and by reference number 710, BS 110 may transmit and UE 120 may receive a reference signal or channel including a paging indicator. For example, during a first period of a DRX cycle, UE 120 may receive a paging indicator indicating whether UE 120 is to skip switching to the normal-power state for one or more subsequent paging cycles. In some aspects, UE 120 may receive information identifying a configuration indicating the time and/or frequency resource for monitoring and receiving the reference signal or channel. For example, UE 120 may determine a paging frame and a paging occasion based at least in part on a paging cycle and a UE identifier of UE 120. In this case, UE 120 may determine the resources for monitoring reference signal or channel based at least in part on the paging frame, the paging occasion, and a time offset value (e.g., a fixed offset value or a system information-configured offset value). In some aspects, UE 120 may perform time and/or frequency tracking or estimation using the reference signal or channel. In this case, based at least in part on performing time and/or frequency tracking or estimation, UE 120 may receive a subsequent communication.

In some aspects, BS 110 may quasi-co-locate (QCL) the reference signal or channel with a synchronization signal block (SSB). Furthermore, BS 110 may quasi-co-locate (QCL) the reference signal or channel with a downlink channel. For example, BS 110 may transmit a paging PDCCH/PDSCH quasi-co-located with the reference signal or channel. In this case, there may be multiple resources for the reference signal or channel, and one or more resources may be associated with a single SSB and each resource may correspond to a beam for transmission of the reference signal. Further, UE 120 may acquire a reception beam for successfully receiving the reference signal and use the beam to receive a broadcast channel. Additionally, or alternatively, BS 110 may transmit the reference signal using a narrower beam than the SSB. For example, a first beam of the reference signal may be located within a second, wider beam of the SSB. In this case, BS 110 may transmit a downlink channel over the narrower beam for coverage enhancement.

In some aspects, UE 120 may use information regarding the SSB to receive the reference signal or channel based at least in part on BS 110 quasi-co-locating the reference signal with the SSB transmission. For example, UE 120 may obtain the SSB for determining and/or refining timing synchronization and/or frequency synchronization and use the SSB to derive a receive beam for reception of the reference signal. Additionally, or alternatively, UE 120 may determine a time resource, frequency resource, receive beam and/or the like for receiving the reference signal and the broadcast channel based on the reference signal.

In some aspects, UE 120 may determine a characteristic of a radio resource management measurement based at least in part on the reference signal. For example, UE 120 may determine to relax a radio resource management measurement based at least in part on a cell quality by measuring the RSRP of the reference signal. In this case, based at least in part on the cell quality satisfying a threshold, UE 120 may forgo performing one or more neighbor cell measurements, thereby reducing power utilization, utilization of network resources, and/or the like. In this way, UE 120 avoids a delay in switching from the normal-power state to the low-power state relative to deriving the cell quality from a synchronization signal or physical broadcast channel measurement.

As further shown by reference number 720, UE 120 may receive the reference signal including a paging indicator and determine to monitor for and receive paging in the next paging cycle rather than skipping monitoring. In this case, UE 120 may track or estimate time and/or frequency resources using the reference signal, and may receive a communication based at least in part on tracking or estimating the time and/or frequency resources. In contrast, as shown in FIG. 7B, and by reference number 720', UE 120 may receive a reference signal indicating that UE 120 is to skip monitoring in one or more subsequent DRX cycles and may forgo switching to the normal-power state for a second period. In this case, UE 120 may forgo switching from the low-power mode to a normal-power mode during a second period of the DRX cycle that is reserved for paging. Additionally, or alternatively, UE 120 may forgo monitoring for a PDCCH and/or PDSCH during the DRX cycle based at least in part on the reference signal. In this way, UE 120 reduces a power utilization relative to switching to the normal-power state when UE 120 is not scheduled to receive, for example, a PDCCH or a PDSCH. In some aspects, the reference signal or channel may include a paging indication identifying a particular quantity of DRX cycles for which to skip monitoring. For example, UE 120 may determine, based at least in part on the reference signal, whether to skip monitoring for a plurality of consecutive DRX cycles, a plurality of non-consecutive DRX cycles according to an identified pattern, and/or the like.

In some aspects, UE 120 may receive the reference signal via a periodic transmission. For example, BS 110 may use, to convey the paging indication associated with the reference signal, a periodic reference signal associated with radio resource management and/or beam refinement for downlink channels. In this case, the reference signal or channel may include information identifying a skip of one or more DRX cycles. Additionally, or alternatively, UE 120 may receive the reference signal or channel via a non-periodic transmission. For example, when a page is scheduled for a paging occasion, BS 110 may transmit the reference signal in connection with the page. In contrast, when a page is not scheduled for the paging occasion, BS 110 may forgo transmission of the reference signal. In this case, the reference signal may only indicate a skip of a single DRX cycle.

In some aspects, the reference signal may include information indicating that paging is present for, for example, a group of UEs. In this case, the group of UEs may attempt to receive the paging and another group of UEs, not indicated by the reference signal, may forgo attempting to receive the paging. In some aspects, the reference signal may include a sequence or identifier to indicate which UE or UEs are to attempt to receive the paging.

As indicated above, FIGS. 7A and 7B are provided as examples. Other examples may differ from what is described with respect to FIGS. 7A and 7B.

Figure 8:
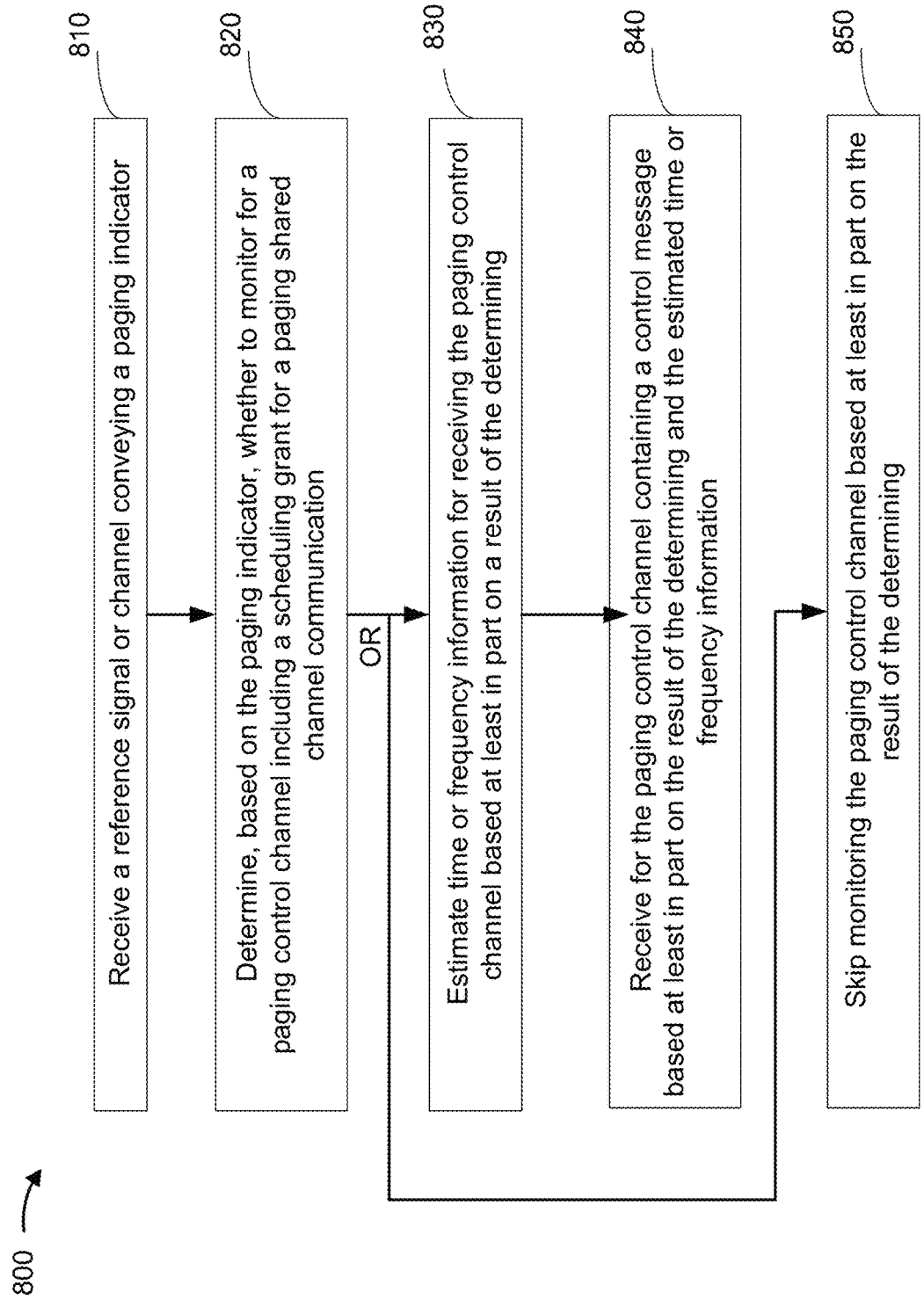
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with paging indication.

As shown in FIG. 8, in some aspects, process 800 may include receiving a reference signal or channel conveying a paging indicator (block 810). For example, the UE (e.g., using receive processor 258, transmit processor 264, controller/processor 280, memory 282, and/or the like) may receive a reference signal or channel conveying a paging indicator, as described above.

As further shown in FIG. 8, in some aspects, process 800 may include determining, based on the paging indicator, whether to monitor a paging control channel including a scheduling grant for a paging shared channel communication (block 820). For example, the UE (e.g., using receive processor 258, transmit processor 264, controller/processor 280, memory 282, and/or the like) may determine, based on the paging indicator, whether to monitor a paging control channel including a scheduling grant for a paging shared channel communication, as described above.

As further shown in FIG. 8, in some aspects, process 800 may include estimating time or frequency information for receiving the paging control channel based at least in part on a result of the determining (block 830). For example, the UE (e.g., using receive processor 258, transmit processor 264, controller/processor 280, memory 282, and/or the like) may estimate time or frequency information for receiving the paging control channel based at least in part on a result of the determining, as described above.

As further shown in FIG. 8, in some aspects, process 800 may include receiving the paging control channel containing a control message based at least in part on the result of the determining and the estimated time or frequency information (block 840). For example, the UE (e.g., using receive processor 258, transmit processor 264, controller/processor 280, memory 282, and/or the like) may receive the paging control channel containing a control message based at least in part on the result of the determining, as described above.

As further shown in FIG. 8, in some aspects, process 800 may include skipping monitoring the paging control channel based at least in part on the result of the determining (block 850). For example, the UE (e.g., using receive processor 258, transmit processor 264, controller/processor 280, memory 282, and/or the like) may skip monitoring the paging control channel based at least in part on the result of the determining, as described above.

Process 800 may include additional aspects, such as any single aspect or any combination of aspects described below and/or in connection with one or more other processes described elsewhere herein.

In a first aspect, the first paging indicator indicates that the skipping monitoring is to occur for a plurality of consecutive paging cycles.

In a second aspect, alone or in combination with the first aspect, the reference signal or channel is a reference signal for beam refinement associated with receiving a downlink channel. In some aspects, the downlink channel includes at least one of a channel for paging or a channel for system information conveyance. In some aspects, the reference signal or channel is an aperiodic reference signal.

In a third aspect, alone or in combination with one or more of the first and second aspects, the reference signal or channel is received based at least in part on a paging message being scheduled for a paging cycle including the first period.

In a fourth aspect, alone or in combination with one or more of the first through third aspects, process 800 includes determining a paging frame and paging occasion based at least in part on a UE identifier of the UE; determining a configuration of a paging cycle based at least in part on the paging frame, the paging occasion, and an offset value, wherein the configuration of the paging cycle is included in the first period; and determining the time or frequency resource for the reference signal based at least in part on the paging frame or paging occasion. In some aspects, the offset value is indicated to the UE or defined in a specification.

In a fifth aspect, alone or in combination with one or more of the first through fourth aspects, a downlink channel is quasi-co-located with the reference signal or channel.

In a sixth aspect, alone or in combination with one or more of the first through fifth aspects, the UE is configured to receive the downlink channel based at least in part on a characteristic of the reference signal or channel.

In a seventh aspect, alone or in combination with one or more of the first through sixth aspects, the characteristic is at least one of a time characteristic, a frequency characteristic, a Doppler characteristic, a spatial relation characteristic, a beam selection characteristic, or a beam width characteristic.

In an eighth aspect, alone or in combination with one or more of the first through seventh aspects, the UE is configured to receive the reference signal based at least in part on a characteristic of a synchronization signal block.

In a ninth aspect, alone or in combination with one or more of the first through eighth aspects, the characteristic is at least one of a time characteristic, a frequency characteristic, a Doppler characteristic, a spatial relation characteristic, or a beam selection characteristic.

In a tenth aspect, alone or in combination with one or more of the first through ninth aspects, the UE is configured to perform a radio resource management measurement based at least in part on the reference signal or channel.

In an eleventh aspect, alone or in combination with one or more of the first through tenth aspects, the radio resource management measurement is a measurement of a demodulation reference signal or a sequence of the reference signal or channel.

In a twelfth aspect, alone or in combination with one or more of the first through eleventh aspects, the UE is configured to perform a relaxed radio resource management measurement decision based at least in part on a measurement of the reference signal or channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a reference signal conveying a paging indicator;
determining, based on the paging indicator, whether to monitor a paging control channel including a scheduling grant for a paging shared channel communication; and
estimating time or frequency information for receiving the paging control channel based at least in part on a result of the determining, and
receiving the paging control channel based at least in part on the result of the determining and the estimated time or frequency information, or
skipping monitoring the paging control channel based at least in part on the result of the determining.

2. The method of claim 1, wherein the paging indicator indicates that the skipping monitoring is to occur for one or a plurality of consecutive paging cycles.

3. The method of claim 1, wherein the reference signal is a periodic reference signal.

4. The method of claim 1, wherein the reference signal is for radio resource management.

5. The method of claim 1, wherein the reference signal is a reference signal for beam refinement associated with receiving a downlink channel.

6. The method of claim 5, wherein the downlink channel includes at least one of: a channel carrying paging information, or a channel carrying system information.

7. The method of claim 1, wherein the reference signal is an aperiodic reference signal.

8. The method of claim 7, wherein the aperiodic reference signal is received based at least in part on a paging message being scheduled for a paging cycle.

9. The method of claim 1, further comprising:
determining a paging frame and paging occasion based at least in part on a UE identifier of the UE and paging cycle;
determining a configuration of a paging cycle based at least in part on the paging frame, the paging occasion, and an offset value; and
determining a time or frequency resource for the reference signal based at least in part on the paging frame or paging occasion.

10. The method of claim 9, wherein the offset value is indicated to the UE or defined in a specification.

11. The method of claim 1, wherein a downlink channel is quasi-co-located with the reference signal.

12. The method of claim 11, wherein the UE is configured to receive the downlink channel based at least in part on a characteristic of the reference signal.

13. The method of claim 12, wherein the characteristic is at least one of: a time characteristic, a frequency characteristic, a Doppler characteristic, a spatial relation characteristic, a beam selection characteristic, or a beam width characteristic.

14. The method of claim 1, wherein the UE is configured to receive the reference signal based at least in part on a characteristic of a synchronization signal block.

15. The method of claim 14, wherein the characteristic is at least one of: a time characteristic, a frequency characteristic, a Doppler characteristic, a spatial relation characteristic, or a beam selection characteristic.

16. The method of claim 1, wherein the UE is configured to perform a radio resource management measurement based at least in part on the reference signal.

17. The method of claim 16, wherein the radio resource management measurement is a measurement of the reference signal.

18. The method of claim 1, wherein the UE is configured to perform a relaxed radio resource management measurement decision based at least in part on a measurement of the reference signal.

19. A user equipment (UE) for wireless communication, comprising:
one or more memories; and
one or more processors coupled to the one or more memories, the one or more processors configured to:
receive a reference signal conveying a paging indicator;
determine, based on the paging indicator, whether to monitor a paging control channel including a scheduling grant for a paging shared channel communication; and
estimate time or frequency information for receiving the paging control channel based at least in part on a result of the determining, and
receive the paging control channel based at least in part on the result of the determining and the estimated time or frequency information, or
skip monitoring the paging control channel based at least in part on the result of the determining.

20. A non-transitory computer-readable medium storing a set of instructions for wireless communication, the set of instructions comprising:
one or more instructions that, when executed by one or more processors of a user equipment (UE), cause the UE to:
receive a reference signal conveying a paging indicator;
determine, based on the paging indicator, whether to monitor a paging control channel including a scheduling grant for a paging shared channel communication; and
estimate time or frequency information for receiving the paging control channel based at least in part on a result of the determining, and
receive the paging control channel based at least in part on the result of the determining and the estimated time or frequency information, or
skip monitoring the paging control channel based at least in part on the result of the determining.

* * * * *